(12) United States Patent
Stockton

(10) Patent No.: US 7,130,843 B2
(45) Date of Patent: Oct. 31, 2006

(54) METHOD, SYSTEM AND PROGRAM PRODUCT FOR LOCATING PERSONAL INFORMATION OVER A NETWORK

(75) Inventor: Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 10/151,343

(22) Filed: May 20, 2002

(65) Prior Publication Data
US 2003/0217060 A1 Nov. 20, 2003

(51) Int. Cl.
G06F 17/30 (2006.01)
(52) U.S. Cl. .................. 707/3; 707/2; 707/4; 707/5; 707/10
(58) Field of Classification Search .................. 707/3, 707/5, 4, 2, 10
See application file for complete search history.

(56) References Cited

U.S. PATENT DOCUMENTS

| | | | | |
|---|---|---|---|---|
| 5,801,747 | A * | 9/1998 | Bedard | 725/46 |
| 5,832,212 | A * | 11/1998 | Cragun et al. | 713/202 |
| 5,974,406 | A * | 10/1999 | Bisdikian et al. | 707/1 |
| 6,253,208 | B1 | 6/2001 | Wittgreffe et al. | 707/104.1 |
| 6,424,968 | B1 * | 7/2002 | Broster et al. | 707/3 |
| 6,658,400 | B1 * | 12/2003 | Perell et al. | 707/1 |
| 6,658,410 | B1 * | 12/2003 | Sakamaki et al. | 707/4 |
| 6,691,123 | B1 * | 2/2004 | Gulliksen | 707/101 |
| 6,728,346 | B1 * | 4/2004 | Czyszczewski et al. | 379/93.03 |
| 2001/0027446 | A1 * | 10/2001 | Metcalfe | 705/67 |
| 2001/0034766 | A1 * | 10/2001 | Morimoto | 709/205 |
| 2001/0054004 | A1 * | 12/2001 | Powers | 705/14 |
| 2002/0046341 | A1 * | 4/2002 | Kazaks et al. | 713/182 |
| 2002/0065830 | A1 * | 5/2002 | de Hilster et al. | 707/102 |
| 2002/0073044 | A1 * | 6/2002 | Singhal | 705/64 |
| 2002/0095389 | A1 * | 7/2002 | Gaines | 705/67 |
| 2002/0102975 | A1 * | 8/2002 | Allen | 455/435 |
| 2002/0116210 | A1 * | 8/2002 | Medina et al. | 705/1 |
| 2002/0147662 | A1 * | 10/2002 | Anderson | 705/26 |
| 2002/0147701 | A1 * | 10/2002 | Chang | 707/1 |
| 2002/0165856 | A1 * | 11/2002 | Gilfillan et al. | 707/3 |
| 2002/0173994 | A1 * | 11/2002 | Ferguson, III | 705/4 |
| 2003/0004842 | A1 * | 1/2003 | Williams et al. | 705/35 |
| 2003/0004897 | A1 * | 1/2003 | Smith | 705/76 |
| 2003/0028469 | A1 * | 2/2003 | Bergman et al. | 705/37 |
| 2004/0172368 | A1 * | 9/2004 | Johnson | 705/64 |
| 2005/0086112 | A1 * | 4/2005 | Shkedi | 705/14 |
| 2005/0108518 | A1 * | 5/2005 | Pandya | 713/151 |
| 2006/0075120 | A1 * | 4/2006 | Smit | 709/227 |

OTHER PUBLICATIONS

Bob Sullivan, "Search for Yourself Online" MSNBC, www.msnbc.com/news/726496.asp?cp1=1, Mar. 19, 2002.

* cited by examiner

*Primary Examiner*—Frantz Coby
(74) *Attorney, Agent, or Firm*—Hoffman, Warnick & D'Alessandro LLC; Jerry W. Herndon, Esq.

(57) ABSTRACT

A method, system and program product for locating personal information over a network are provided. Specifically, under the present invention, personal information is entered using an interface. Then, a search string(s) based on the entered information is formed by processing the personal information according to a definable algorithm(s). Once the search string(s) is formed, a search based on the string(s) is conducted over a network to identify any network destinations storing the personal information. The identified network destinations can then be notified to remove/delete the personal information.

23 Claims, 6 Drawing Sheets

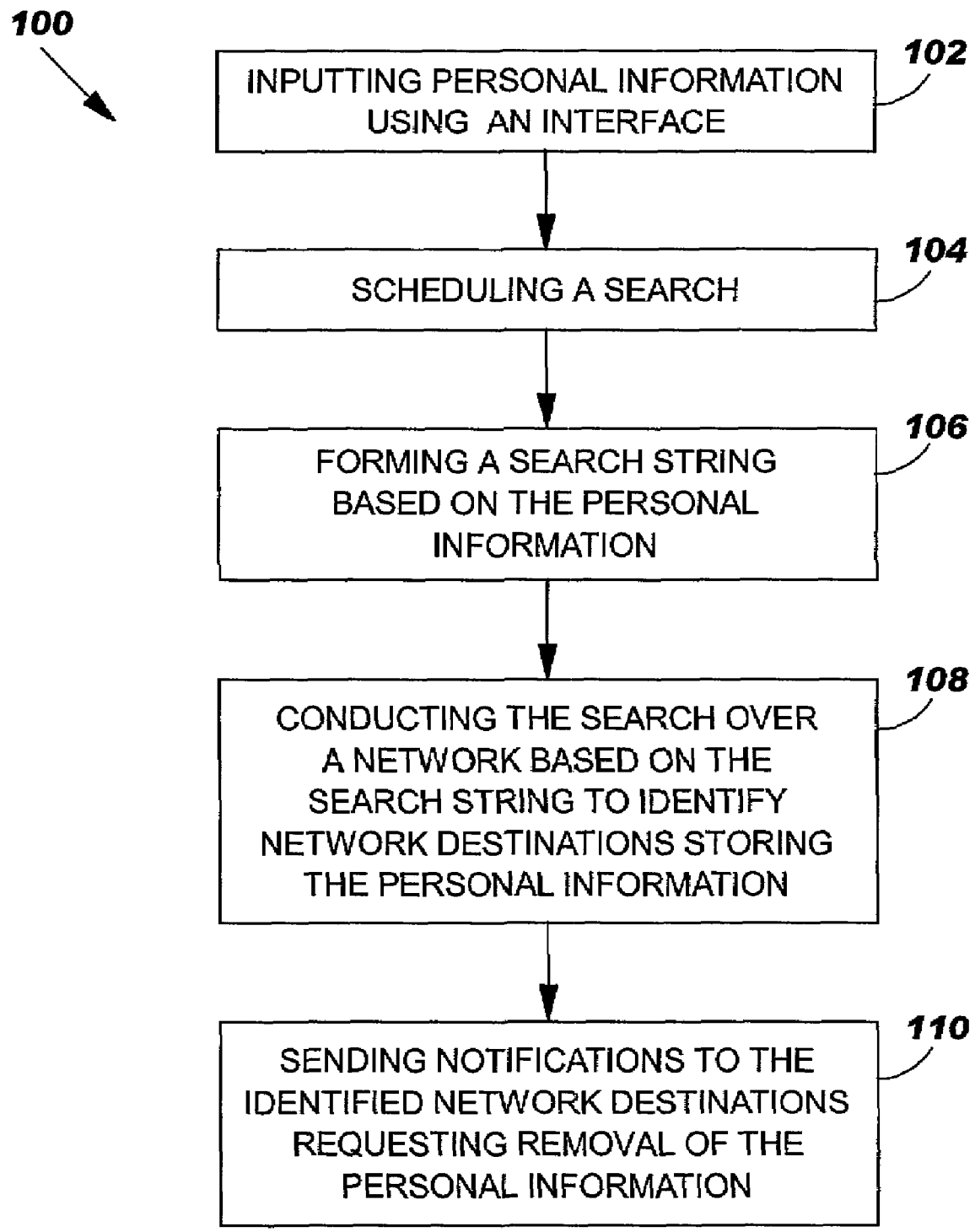

METHOD, SYSTEM AND PROGRAM PRODUCT FOR LOCATING PERSONAL INFORMATION OVER A NETWORK

BACKGROUND OF THE INVENTION

1. Field of the Invention

The present invention generally relates to a method, system and program product for locating personal information over a network. Specifically, the present invention allows a network user to automatically identify network destinations that are storing the user's personal information.

2. Background Art

As the use of computers becomes more pervasive, computer users are increasingly using the Internet to complete everyday tasks. For example, today a computer user can purchase consumer goods, renew a driver's license and register to vote from the comfort of his/her home. Unfortunately, many on-line transactions require the user to submit some form of personal information. For example, each time a consumer uses a World Wide Website to make a purchase, he/she will be inevitably required to submit some form of personal information for the transaction to be completed. Such information often includes, among other things, the user's name, address, credit card information, etc. Although the user typically desires the personal information to remain private, success is not always guaranteed. For example, many web storage systems are frequently the targets of intruders who attempt to access personal information for illicit purposes. Moreover, many intended recipients (e.g., web companies) sell the personal information to third parties to do with as they please. Given the high volume of transactions that are conducted on-line, the user usually cannot identify of all of the parties possessing his/her personal information.

In an attempt to resolve some of these issues, many legislative bodies have enacted laws to better control the privacy of personal information. However, given the widespread nature of the Internet, and the lack of uniformity between the localities, enforcement of privacy laws is extremely difficult. For example, an Internet company operating in locality "A" may not have to follow the privacy laws set forth by locality "B." Accordingly, it is often left up to the user to control the distribution of his/her personal information.

Heretofore, a network user controlled the distribution of his/her personal information by manually conducting searches using multiple search strings to identify network destinations where the personal information was stored. Once a network destination was identified, the user could then manually request the information to be deleted/removed. Given the widespread use of the Internet by many users, and the quantity of locations to be searched, this process has been both tedious and inefficient.

In view of the foregoing, there exists a need for a method system and program product for locating personal information over a network. Specifically, an application is needed whereby a user can enter personal information, and have a search conducted over a network to identify network destinations storing the personal information.

SUMMARY OF THE INVENTION

The present invention generally provides a method, system and program product for locating personal information over a network. Specifically, under the present invention, a user will enter personal information and optionally designate a search schedule using an interface. One or more search strings will then be formed by processing the entered personal information according to a definable algorithm. Based on the developed search string(s), a search of the network will be conducted to identify network destinations storing the personal information. Once identified, notifications can be sent to the network destinations requesting the personal information to be removed.

According to a first aspect of the present invention, a method for locating personal information over a network is provided. The method comprises: (1) inputting personal information using an interface; (2) forming a search string based on the personal information; and (3) conducting a search over a network based on the search string to identify network destinations storing the personal information.

According to a second aspect of the present invention, a method for locating personal information over a network is provided. The method comprises: (1) inputting personal information using an interface; (2) scheduling a search for the personal information using the interface; (3) forming at least one search string by processing the personal information according to at least one definable algorithm; and (4) conducting the search over a network based on the search string to identify network destinations storing the personal information.

According to a third aspect of the present invention, a system for locating personal information over a network is provided. The system comprises: (1) a string system for forming a search string based on personal information entered using an interface; and (2) a search system for conducting a search over a network based on the search string to identify network destinations storing the personal information.

According to a fourth aspect of the present invention, a program product stored on a recordable medium for locating personal information over a network, is provided. When executed, the program product comprises: (1) program code for forming a search string based on personal information entered using an interface; and (2) program code for conducting a search over a network based on the search string to identify network destinations storing the personal information.

Therefore, the present invention provides a computer-implemented method, system and program product for locating personal information over a network.

BRIEF DESCRIPTION OF THE DRAWINGS

These and other features of this invention will be more readily understood from the following detailed description of the various aspects of the invention taken in conjunction with the accompanying drawings in which:

FIG. 6 depicts a method flow diagram according to the present invention.

Figure 1:
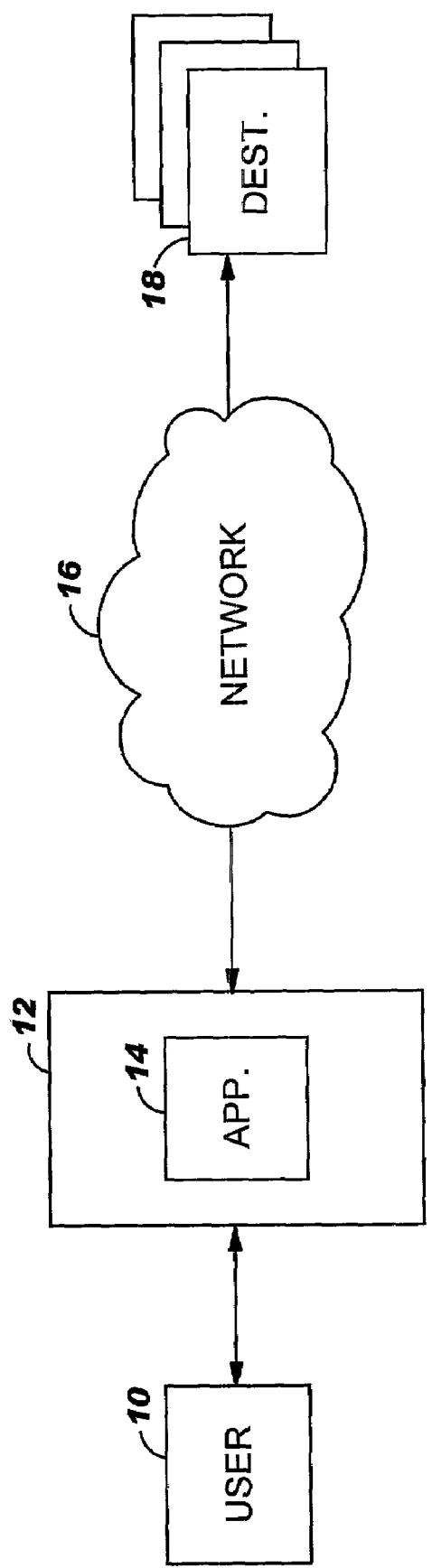
FIG. 1 depicts the location of personal information over a network according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a computer-implemented method, system and program product for automatically locating personal information over a network. Referring now to FIG. 1, a flow diagram of the present invention is shown. As depicted, a computer/network user 10 will input personal information and optionally designate a search schedule into computer system 12 using an interface. As will be further described below, computer system 12 can be a personal computer/client onto which application 14 is downloaded or loaded from a recordable medium. Alternatively, computer system 12 could be a server that user 10 accesses from a personal computer/client. In either event, the teachings of the present invention are intended to equally encompass any possible variation. Moreover, as used herein, the term personal information is intended to mean any type of information that can be entered using an interface and searched for over a network. In a typical embodiment, personal information includes, among other things, names, addresses, telephone numbers, credit card information, social security numbers, medical information, financial information, etc.

Once entered, application 14 will form one or more search strings by processing the personal information according to at least one algorithm, which is freely definable by user 10 and/or an administrator (not shown). The purpose of processing the personal information according to at least one "definable" algorithm is so that searches for the personal information can be conducted over the network without complete pieces of information being used. For example, the algorithm may dictate that for numeric information (e.g., credit card numbers, social security numbers, etc.), only the last four digits should be used when conducting the search. Thus, a search string for a user entering a social security number of "123-45-6789" would be "6789." This prevents the present invention from further exposing user 10 to security risks.

Once the search string(s) have been formed, a search will be conducted over network 16 based thereon. In a typical embodiment, network 16 is the Internet. However, it should be understood that the present invention could be used to locate personal information over any type of network (e.g., LAN, WAN, VPN, etc.). In any event, the goal of the search is to identify any network destinations 18 that are storing the personal information. As referred to herein, network destinations 18 can be any location reachable over a network. Examples of network destinations 18 include, among other things, servers, websites, search engines, etc. To this extent, network destinations 18 are intended to encompass locations that are used to perform searches (e.g., a search engine) as well as locations that are revealed by a search (e.g., websites). In conducting the search(es), application 14 will query various network destinations 18 in an attempt to determine particular network destinations 18 that are storing user's 10 personal information. For example, application 14 could perform the search using one or more search engines to identify the websites that are storing user's 10 personal information.

In a typical embodiment, a configurable list of target network destinations to search and associate algorithms are provided by user 10 and/or an administrator. The list of network destinations could identify specific search engines and websites to be searched. For example, the list could identify the twenty most popular search engines, and the websites that are known to be common offenders. This allows the search to be more focused and accurate. In addition, the list could correlate the listed destinations with specific algorithms. In particular, not all destinations are best searched using the same algorithms. Thus, user 10 and/or administrator can provide algorithms that are best suited for each destination. To this extent, it should be understood that the user's 10 personal information could be converted into search strings using one or more distinct algorithms.

Once identified, network destinations 18 are reported to user 10 so that notifications can be sent to network destinations 18 requesting removal of the personal information. In general, the notifications can be sent automatically or based on the prompting of user 10. Moreover, the notifications are sent according to the particular protocol and format of each individual network destination 18. For example, if network destination "A" prefers to communicate in extensible markup language (XML) format, application 14 will generate and send a "removal" notification in XML format. Conversely, if network destination "B" receives communications by facsimile, application 14 will generate a "removal" notification via facsimile. Accordingly, the present invention is capable of accommodating all known communication formats and protocols.

It should be appreciated that in sending notifications to network destinations 18, it may be necessary to send notification to a destination that produced search results (e.g., a search engine) as well as the search results (e.g., commercial websites) themselves. For example, a search engine that reveals three websites that are storing user's 10 personal information might itself maintain a local cache copy of the web pages that it searched. Accordingly, it could be desirable to send notifications both to the identified websites and the search engine. In any event, both the search engine and the websites are considered to be network destinations under the present invention.

Figure 2:
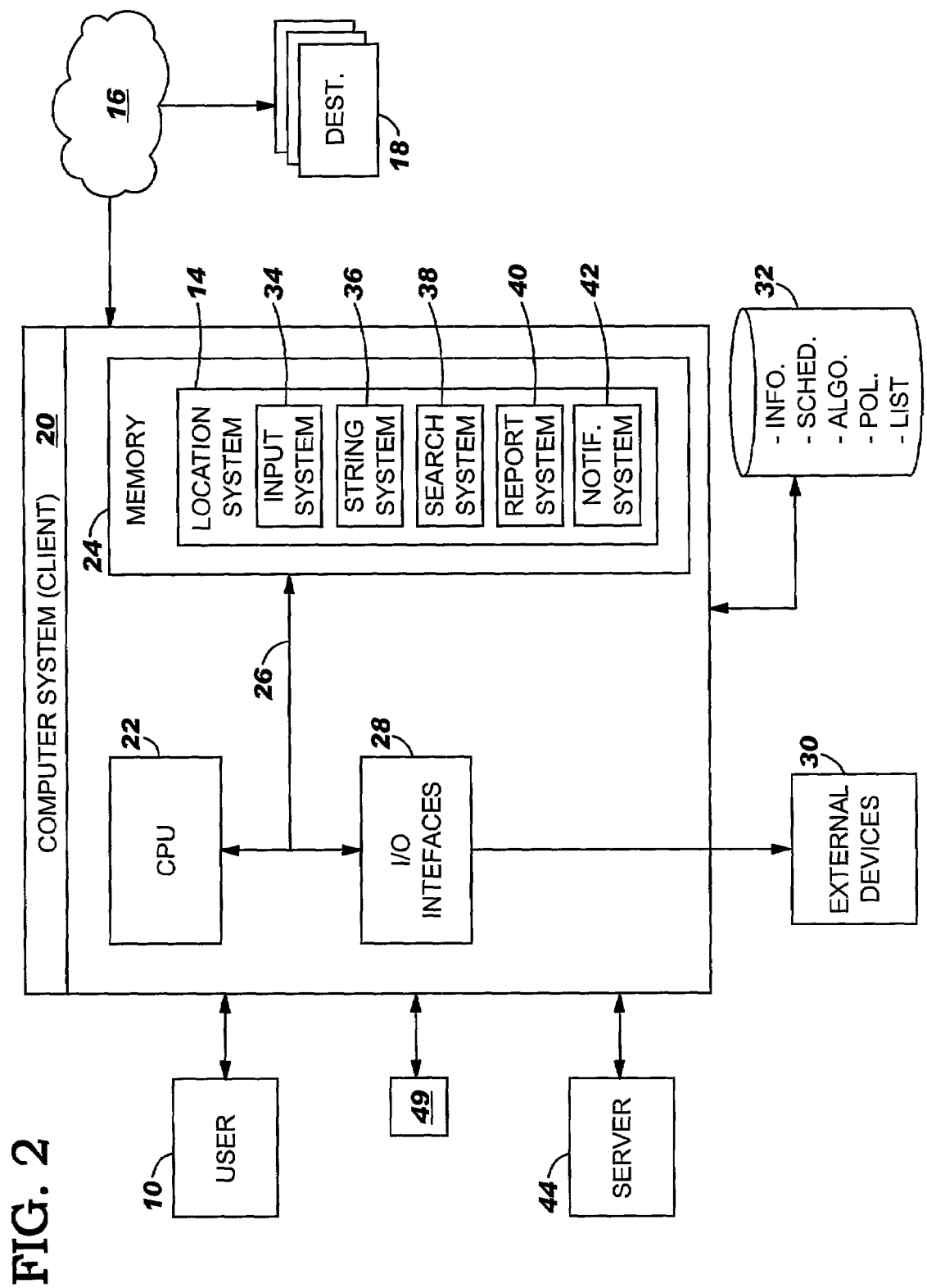
FIG. 2 depicts a first exemplary implementation of the present invention.

Referring now to FIG. 2, a first computerized implementation of the present invention is depicted. As indicated above, user 10 accesses location system (application) 14 to automatically conduct a search over network 16 to identify network destinations 18 storing personal information. Under the embodiment shown in FIG. 2, computer system 20 is a personal computer/client that is directly accessed by user 10. To this extent, location system 14 can be downloaded from server 44, or loaded from a recordable medium (e.g., diskette, CD-ROM, etc.).

As further shown, computer system/client 20 generally comprises central processing unit (CPU) 22, memory 24, bus 26, input/output (I/O) interfaces 28 and external devices/resources 30. CPU 22 may comprise a single processing unit, or be distributed across one or more processing units in one or more locations, e.g., on a client and server. Memory 24 may comprise any known type of data storage and/or transmission media, including magnetic media, optical media, random access memory (RAM), read-only memory (ROM), a data cache, a data object, etc. Moreover, similar to CPU 22, memory 24 may reside at a single physical location, comprising one or more types of data storage, or be distributed across a plurality of physical systems in various forms.

I/O interfaces 28 may comprise any system for exchanging information to/from an external source. External devices/resources 30 may comprise any known type of external device, including speakers, a CRT, LED screen, hand-held device, keyboard, mouse, voice recognition system, speech output system, printer, monitor, facsimile, pager, etc. Bus 26 provides a communication link between each of the components in computer system/client 20 and likewise may comprise any known type of transmission link, including electrical, optical, wireless, etc. In addition, although not shown, additional components, such as cache memory, communication systems, system software, etc., may be incorporated into computer system/client 20.

Database 32 provides storage for information necessary to carry out the present invention such as personal information and search schedules as entered by user 10, algorithms for forming search strings based on entered personal information, privacy policies as entered by user 10 and/or an administrator 49, and a configurable list of target network destinations and associated information/algorithms as provided by user 10 and/or administrator 49. As such, database 32 may include one or more storage devices, such as a magnetic disk drive or an optical disk drive. In another embodiment, database 32 resides on network-attached storage. Specifically, database 32 could include data distributed across, for example, a local area network (LAN), wide area network (WAN) or a storage area network (SAN) (not shown). Database 32 may also be configured in such a way that one of ordinary skill in the art may interpret it to include one or more storage devices.

Stored in memory 24 of computer system/client 20 is location system 14. As depicted, location system 14 includes input system 34, string system 36, search system 38, report system 40 and notification system 42. Input system 24 generally includes a user interface for user 10 to enter any personal information that he/she wishes to locate over network 16, and optionally designate preferences (e.g., search schedules).

Figure 4:
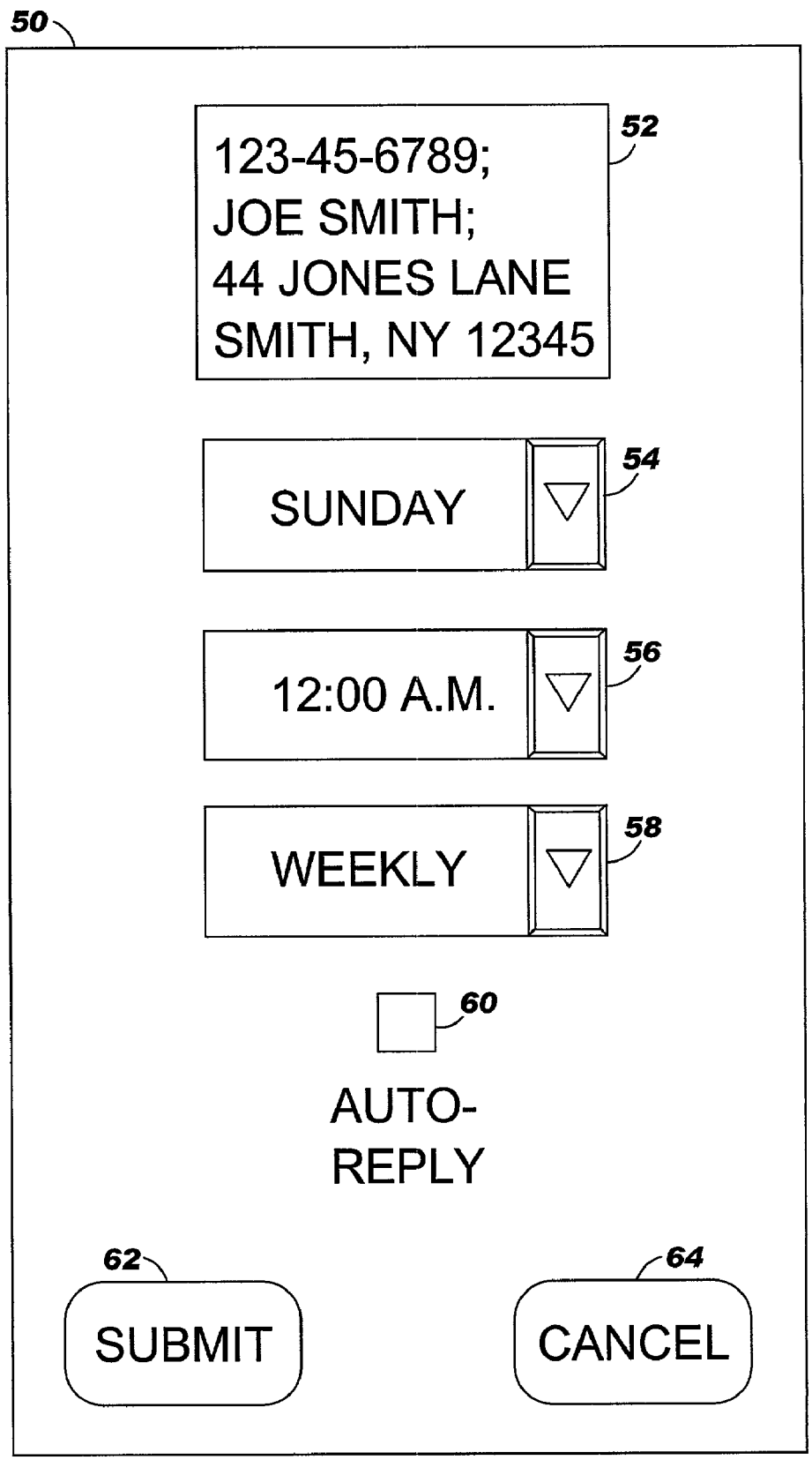
FIG. 4 depicts an exemplary interface for entering personal information and designating preferences according to the present invention.

Referring to FIG. 4, an exemplary user interface 50 is shown. As depicted, user interface 50 includes information window 52, menus 54, 56 and 58, reply box 60, and buttons 62 and 64. User 10 will enter any personal information he/she wishes to locate into information window 52. As shown, such information could include, for example, a social security number, a name and an address. Once the desired information has been entered, user 10 can optionally select a search schedule using menus 54, 56 and 58. In the example shown in FIG. 4, user 10 wishes to conduct a search for the entered information every Sunday morning at 12:00 A.M. This scheduling feature allows searches to be conducted when user 10 is not present. Moreover, by scheduling the searches, user 10 will not have to remember to periodically request a search. Reply box 60 can be used to select whether a reply notification should be automatically sent to any identified network destinations. For example, if a search for the entered information reveals that network destinations "A" and "B" are storing some or all of the entered information, a notification requesting the removal thereof can be sent. Reply box 60 allows such a notification to be sent without prompting by user 10. Selection of submit button 62 will store the entered information and selected features in database 32 (FIG. 2), while cancel button 64 will clear the interface for user 10 to begin again.

Referring back to FIG. 2, privacy policies are shown in database 32. These policies can be provided by user 10 and/or administrator 48 to exploit privacy features in computer system/client 20. These policies help ensure that the data is handled properly on computer system/client 20. Once user 10 has entered the desired personal information and designated any preferences, one or more search strings will be formed via string system 36. Specifically, as indicated above, location system 14 is programmed with one or more definable algorithms. The algorithms are used by string system 36 to process the entered personal information to form one or more search strings. For example, one algorithm may dictate that an entered last name be combined with an entered social security number. However, another algorithm may dictate that only the last four digits of a piece of numeric personal information are used during a search. Based on these algorithms, one search string formed from the information shown in FIG. 4, could be "JOE&SMITH&6789." It should be appreciated that algorithms for names (personal, street, etc.) in particular could generate several variations of the name, which should each be searched. For example, the name JOE SMITH could yield the following variations: (1) J. SMITH; (2) JOE S.; and (3) JOE SMITH. Thus, the present invention will likely utilize one or more algorithms to produce one or more search strings.

It should also be understood that string system 36 could be used by administrator 49 and/or user 10 to establish or edit algorithms. This allows the present invention to be tailored for each user 10. For example, if user 10 wishes to search for more than the last four digits of his/her social security number, user 10 could access string system 26 to edit the applicable algorithm.

As indicated above, user 10 and/or administrator 49 could also provide (e.g., via input system 24) a configurable list of target network destinations and associated algorithms (shown stored in database 32). The list could identify specific network destinations (e.g., search engines, websites, etc.) to be searched, as well as the particular algorithms that will yield the most effective search for each listed destination. In this case, string system 36 will access database 32 and generate search strings for each listed network destination using any corresponding, listed algorithms. Once the search strings have been formed, the search will be conducted by search system 38 according to any defined schedule (e.g., Sunday morning at 12:00 A.M.). In conducting the search, search system 38 will access various websites and search engines (including any specifically delineated in the configurable list) and conduct searches using the search strings. For example, search system could access the search engine "qrs.com" and conduct a search using the search string "JOE&SMITH&6789." The goal of conducting the searches is to identify any network destinations 18 that are storing user's 10 entered personal information.

Figure 5:
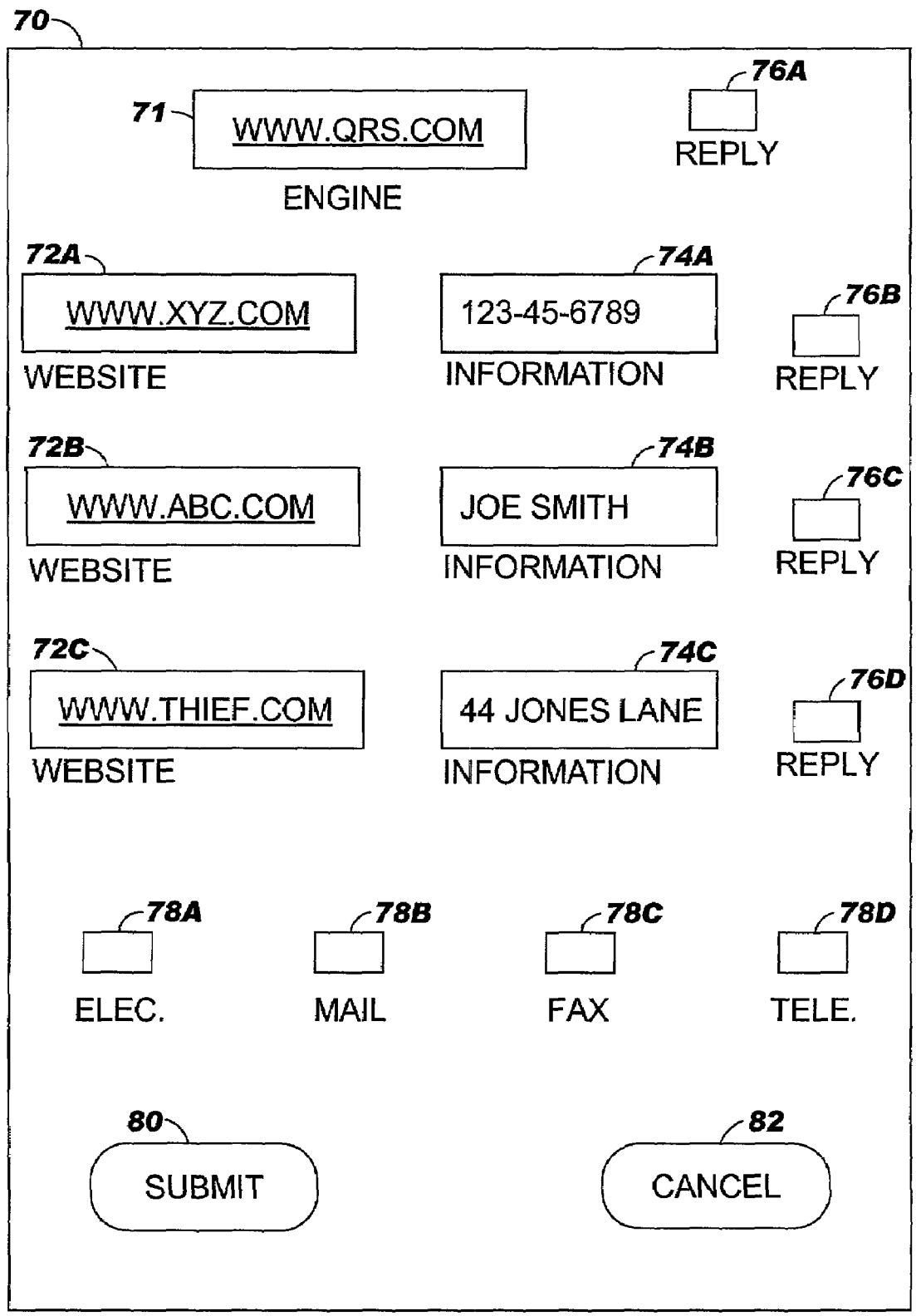
FIG. 5 depicts an exemplary report resulting from a search conducted according to the present invention.

Upon completion of the searches, user 10 will be presented with a report detailing any findings. Referring to FIG. 5, an exemplary report 70 is shown. As depicted, report 70 includes engine window 71, website windows 72A–C and corresponding information windows 74A–C detailing a search engine used, the personal information located and the destination at which it was found. For example, a search conducted via search engine "qrs.com" revealed that website "xyz.com" had stored the entered social security number. Similarly, websites "abc.com" and "thief.com" had stored user's 10 entered name and address, respectively. Thus, report 70 presents user 10 with a complete depiction of the search results. In addition, report 70 could display the network destinations in windows 71 and 72A–C as hyperlinks. Upon selection of a hyperlink, user 10 will be routed to the web page where the corresponding personal information was found. This allows user 10 to see the specific manner and context in which the personal information is being stored and/or used.

Based on the report, notification system 42 can be used to send electronic or non-electronic notifications to the identified network destinations, which could include both the search engine as well as the websites (as indicated above). For example, if user 10 had selected auto-reply box 60 via interface 50, reply notifications would automatically be generated and transmitted to each network destination requesting removal of the located information. Conversely, if user 10 had not selected auto-reply, user 10 could manipulate reply boxes 76B–D to individually select the network destinations to which notifications should be sent. Individual selection could be advantageous because some network destinations identified in report 70 could be legitimately possessing user's 10 entered information. In any event, all notifications are generated and sent by notification system 42 according to the format and protocol preferred by the particular network destination. For example, if website "xyz.com" receives communication in an XML format, notification system 42 will generate the notification as an XML document. Conversely, if a network destination receives communication by telephone, notification system 42 could prompt system administrator 49 (or the like) to place the appropriate call. To this extent, notification system 42 is capable of notifying network destinations by both electronic (e.g., electronic mail, facsimile, etc.) and non-electronic (telephone, postal mail, etc.) means.

In another embodiment, user 10 can select the mode of communication for the notifications via mode boxes 78A–D. In this case, the selected mode would override any mode preferred by the network destinations Manual selection of the mode could be useful, for example, in the event that user 10 wishes to establish a written record of communication with the network destinations. In any event, once any notification preferences have been selected, user 10 would select submit button 80 to store and execute the selected notification preferences, or cancel button 82 to clear the preferences.

Figure 3:
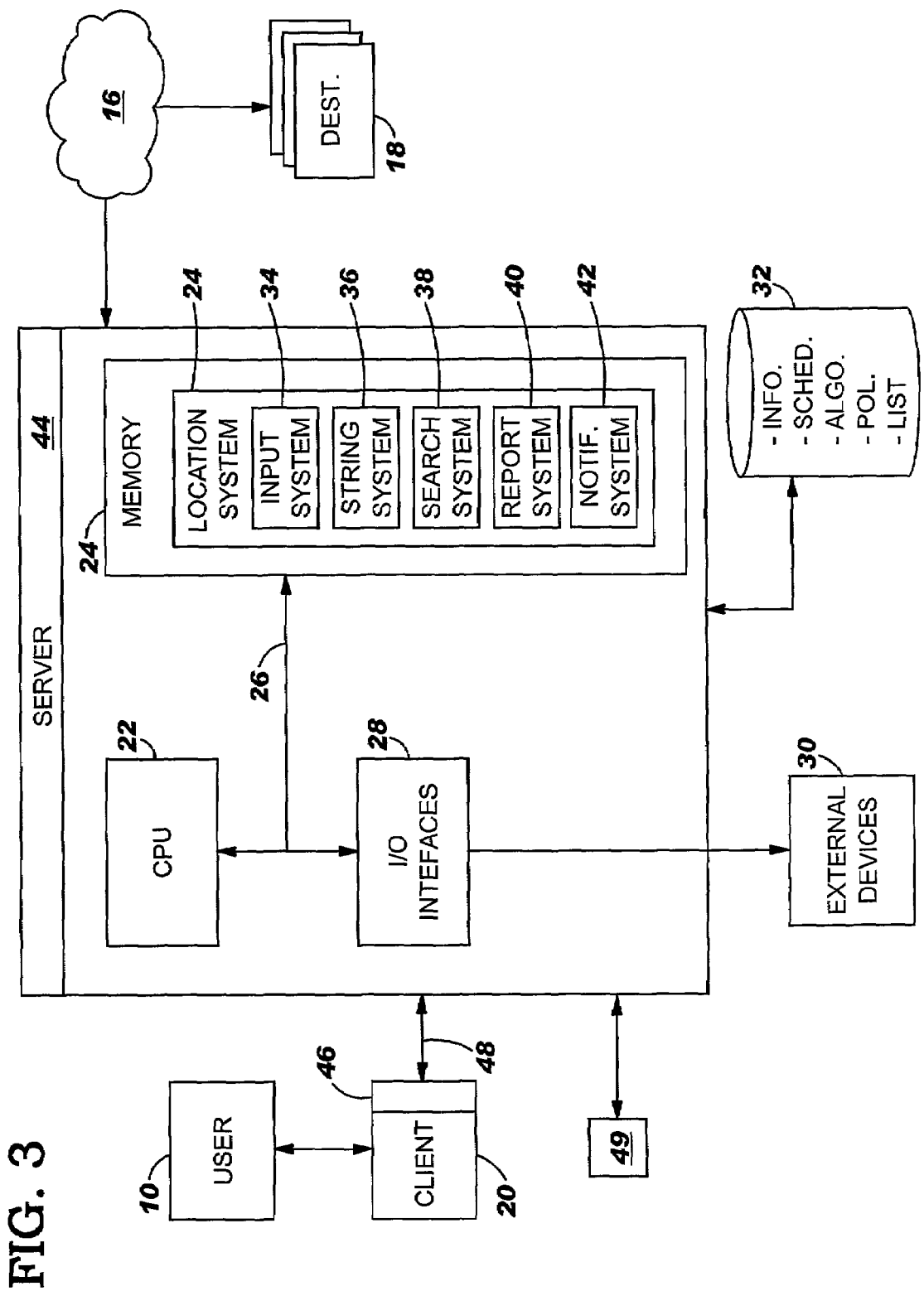
FIG. 3 depicts a second exemplary implementation of the present invention.

Referring now to FIG. 3, an alternative embodiment of the present invention is shown. As depicted, user 10 manipulates computer system/client 20 to access server 44 and location system 24. This embodiment is intended to demonstrate that location system 24 need not be loaded on user's 10 computer system/client 20 as shown in FIG. 2. Rather, user 10 can access location system 24 over a network via communication link 48.

Communications link 48 is intended to represent any possible method of communicating with server 44. For example, communication could occur via a direct hardwired connection (e.g., serial port), or via an addressable connection (e.g., remotely). In the case of the latter, server 44 and client 20 may be connected via the Internet, wide area networks (WANs), local area networks (LANs) or other private networks. Server 44 and client 20 may utilize conventional wireline or wireless network connectivity, such as Token Ring, Ethernet, or other conventional communications standards. Where client 20 communicates with server 44 via the Internet, connectivity could be provided by conventional TCP/IP sockets-based protocol. In this instance, client 20 would utilize an Internet service provider to establish connectivity to server 44.

As shown, server 44 includes computerized components (e.g., CPU 22, memory 24, bus 26, I/O interface 28 and external devices 30) similar to computer system 20 of FIG. 2. Moreover, location system 24 performs functions similar to location system 14. In this embodiment, however, user 10 accesses server 44 via an interface 46 (e.g., web browser) on client 20. To this extent, input system 34 need not include its own interface for entering information and designating preferences. Input system 34 will simply receive entered information and preferences (e.g., schedules, auto-reply commands, etc.) for storage in database 32, which privacy policies and corresponding privacy implementations will protect. Once the information and preferences have been received, string system 36 will form one or more search strings by processing the entered personal information according to at least one definable algorithm (including any set forth in the configurable list stored in database 32). Search system 38 will then execute searches over network 16 (according to any defined schedules) based on the search strings to identify network destinations 18 storing the personal information. Once the searches are complete, report system 40 will report to user 10 all network destinations 18 identified by the search. Notification system 42 will then manage the generation and transmissions of notifications to the identified network destinations 18. Similar to location system 14 shown in FIG. 2, notifications can be sent automatically via designation at interface 46, or individually via designation at report 70 (e.g., FIG. 5). Moreover, the notifications will be sent in the format and protocol preferred by each network destination unless overridden by user 10.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls systems 20 and/or 44 such that they carry out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. In a typical embodiment, the present invention is programmed in the Java programming language. To this extent, location system 24 could be implemented as one or more servlets and applets. However, it should be understood that any known programming language could be utilized to implement the present invention Referring now to FIG. 6, a method flow diagram 100 according to the present invention is shown. As depicted, first step 102 of method 100 is to enter personal information using an interface. As described herein, the interface could be part of the input system (FIG. 2) or could be a web browser executed from a client (FIG. 3). In either event, the user could then schedule a search in step 104. Once scheduled, a search string will be formed based on the personal information in step 106. This involves processing the personal information according to a definable algorithm. Once the search string is formed, the search will be conducted over a network based on the search string to identify network destinations storing the personal information in step 108.

Once identified, notifications can be sent to the network destinations requesting removal of the personal information in step 110.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, it should be appreciated that interface 50 and report 70 shown in FIGS. 4 and 5 are intended to be illustrative only and many variations could be implemented under the present invention. Moreover, it should be understood that the present invention could optionally be implemented for a fee under any known pricing structure. For example, user 10 could be required to pay a fee for each search conducted over network 16. Alternatively, user 10 could be charged a periodic (e.g., monthly, annually, etc.) subscription fee for an unlimited or fixed quantity of searches. In any event, the precise pricing structure is not intended to be a limiting part of the present invention.

The invention claimed is:

1. A method for locating personal information over a network, comprising:
   inputting personal information using an interface;
   scheduling the search using the interface;
   forming with a computer application a search string based on the personal information by processing the personal information according to at least one definable algorithm, the search string including text from the personal information automatically selected by the computer application;
   conducting a search over a network based on the search string to identify network destinations storing the personal information;
   accessing an application prior to the inputting step, wherein the search is conducted by the application;
   providing a configurable list of target network destinations and corresponding algorithms;
   forming a search string for each of the target destinations based on the corresponding algorithms; and
   conducting a search of each of the target destinations using the corresponding target search string.

2. The method of claim 1, further comprising reporting the network destinations to a user.

3. The method of claim 1, further comprising sending notifications for removal of the personal information to the network destinations, wherein the network destinations include at least one of a search engine and a website.

4. The method of claim 1, wherein the network is the Internet.

5. The method of claim 1, wherein the application is downloaded from a server to a client.

6. The method of claim 1, wherein the application is accessed from a recordable medium.

7. The method of claim 1, wherein the application is loaded on a server and is accessed from a client.

8. A method for locating personal information over a network, comprising:
   inputting personal information using an interface;
   scheduling a search for the personal information using the interface;
   forming at least one search string by processing the personal information with a computer application according to at least one definable algorithm, the at least one search string including text from the personal information automatically selected by the computer application;
   conducting the search over a network based on the at least one search string to identify network destinations storing the personal information;
   accessing an application prior to the inputting step, wherein the search is conducted by the application;
   providing a configurable list of target network destinations and corresponding algorithms;
   forming at least one target search string for each of the target destinations based on the corresponding algorithms; and
   conducting a search of each of the target destinations using the corresponding at least one target search string.

9. The method of claim 8, further comprising reporting the network destinations to a user.

10. The method of claim 8, further comprising sending notifications for removal of the personal information to the network destinations.

11. The method of claim 8, wherein the network is the Internet.

12. The method of claim 8, wherein the application is downloaded from a server to a client.

13. The method of claim 8, wherein the application is accessed from a recordable medium.

14. The method of claim 8, wherein the application is loaded on a server and is accessed from a client.

15. A system for locating personal information over a network, comprising:
   a string system for forming a search string using a computer application based on personal information entered using an interface, the search string including text from the personal information automatically selected by the computer application by processing the personal information according to at least one definable algorithm; and
   a configurable list of target network destinations and corresponding algorithms, wherein a search string is formed for each of the target network destinations based on the corresponding algorithms;
   a search system having an application for conducting a search over a network based on the search string to identify network destinations storing the personal information and for conducting a search of each of the target network destinations using the corresponding at least one target search string, wherein the search is scheduled via the interface and wherein the application is accessed prior to entering of the personal information.

16. The system of claim 15, further comprising:
   a reporting system for reporting the network destinations to a user; and
   a notification system for sending notifications for removal of the personal information to the network destinations.

17. The system of claim 16, wherein the notifications are selected from the group consisting of electronic notifications and non-electronic notifications.

18. The system of claim 15, further comprising a database for storing the entered personal information, wherein the database resides on network-attached storage.

19. The system of claim 15, wherein the network is the Internet.

20. A program product stored on a recordable medium for locating personal information over a network, which when executed comprises:

program code for scheduling a search for the personal information via an interface;

program code for forming a search string by processing the personal information with a computer application according to a definable algorithm based on personal information entered using the interface, the search string including text from the personal information automatically selected by the computer application; and program code for conducting a search over a network based on the search string to identify network destinations storing the personal information, program code for accessing an application prior to the inputting step, wherein the search is conducted by the application;

program code for providing a configurable list of target network destinations and corresponding algorithms;

program code for forming at least one target search string for each of the target destinations based on the corresponding algorithms; and program code for conducting a search of each of the target destinations using the corresponding at least one target search string.

21. The program product of claim 20, further comprising:

program code for reporting the network destinations to a user; and program code for sending notifications for removal of the personal information to the network destinations.

22. The program product of claim 21, wherein the notifications are selected from the group consisting of electronic notifications and non-electronic notifications.

23. The program product of claim 20, wherein the network is the Internet.

* * * * *